Oct. 5, 1937.  E. M. BRICKETT ET AL  2,095,166
APPARATUS FOR REMOVING EXTRANEOUS MATTERS FROM WOOL
Filed July 23, 1935  6 Sheets-Sheet 3

Oct. 5, 1937.  E. M. BRICKETT ET AL  2,095,166
APPARATUS FOR REMOVING EXTRANEOUS MATTERS FROM WOOL
Filed July 23, 1935  6 Sheets-Sheet 6

Patented Oct. 5, 1937

2,095,166

UNITED STATES PATENT OFFICE 2,095,166

APPARATUS FOR REMOVING EXTRANEOUS MATTERS FROM WOOL

Edward M. Brickett, North Chelmsford, Mass., Spencer A. Coleman, Pelham, N. H., and Armand W. Benoit, Malden, Mass., assignors to California Process Company, Los Angeles, Calif., a corporation of Nevada Application July 23, 1935, Serial No. 32,782

25 Claims. (Cl. 19—66)

This invention is a novel apparatus especially adapted for use in cleaning, degreasing, and drying wool as described in Greenleaf Patent No. 1,866,-205 dated July 5, 1932, and Brown Patent No. 1,894,154 dated January 10, 1933, but may also be used for other purposes in the treatment of fibres and other material.

The preferred form of apparatus in brief comprises a freezing chamber, means for moving material therethrough, means for circulating cold air in the chamber, means for feeding material such as wool or animal fibres, into the chamber, a "duster" for removing from the refrigerated material extraneous foreign matters, a chamber into which the duster discharges the material, means for discharging the material from said chamber, means for removing the separated foreign matters from the air circuit; and means for de-humidifying the air trapped in the material before it enters the freezing chamber; and means for preventing entry of unwanted atmospheric air into the refrigerated portions of the apparatus or escape of cold air therefrom.

In the accompanying drawings we have illustrated the at present preferred form of the apparatus; also some variations or modifications thereof, and also some of the novel detail features of such apparatus.

To facilitate an understanding of the invention we will explain the apparatus as used for separating extraneous foreign matters from wool fibres by the processes set forth in the aforesaid patents. Those skilled in the art, when familiar with the apparatus, will readily understand how it may be adapted for use for other purposes in the arts. The novel combinations and novel features of construction for which protection is desired are hereinafter pointed out in the claims.

In the accompanying drawings—

In the apparatus shown in Figs. 1 to 8, a feeder B discharges the material into a de-humidifying chamber D and onto the receiving end of a conveyor 6, preferably of the endless type, which carries the material from chamber D into a freezing chamber C, wherein the material is subjected to the action of refrigerated air currents; and discharges the material from said chamber onto a collecting conveyor 14 which intermittently discharges the material into a "duster" 15 in which extraneous foreign impurities are separated from the material; and the cleaned material is discharged from the duster into a winnowing chamber 16, wherein a further separation is made between fine particles of foreign matters and the cleaned material. The clean material is removed from the winnowing chamber through air ducts and discharged at the outlet 3. The impurities separated from the material by the duster are discharged outside the apparatus by means hereinafter explained; and the dust-laden air from the duster and the winnowing chamber are returned to a dust separator, preferably of the bag-type, wherein the dust particles are separated from the air; and the cleansed air may be returned to the freezing chamber.

Preferably the operative portions of the apparatus, with the exception of the feeder B, are enclosed in a casing A having non-heat conducting walls to assist in maintaining the desired low temperature within the casing.

The feeder B is preferably of the "automatic" type (made by C. G. Sargent's Sons Corporation, Graniteville, Massachusetts) and has a hopper B' into which the material to be treated is deposited, and an elevator B2 delivering the material through an inlet opening I, upon the receiving end of the conveyor 6 in the de-humidifying chamber D.

Adjacent inlet opening I, is a pair of in-feeding rolls 2—2 (Fig. 2), between which the material is passed into the de-humidifying chamber D, said rolls squeezing trapped air out of the entering material and preventing inflow of warm air into the casing.

In the de-humidifying chamber D is a fan $7x$ mounted upon a shaft $7b$, and adapted to direct air downwardly through refrigerating coils 9, disposed at one side of conveyor 6. In this chamber D the air is de-hydrated, and the material is cooled to approximately 34° F. Any air entering inlet I with the material is de-humidified or defrosted in chamber D, the moisture being deposited as frost on the pipe coils 9. The frost may be removed from coils 9 when necessary.

In the casing A, adjacent chamber D, is a freezing chamber C, preferably formed of an enclosed framework covered by metallic plates C'. The front wall 5 of the freezing chamber C (Fig. 2) and an extension of the rear wall C' thereof, separates the defrosting chamber D from the interior of the casing.

Figure 1:
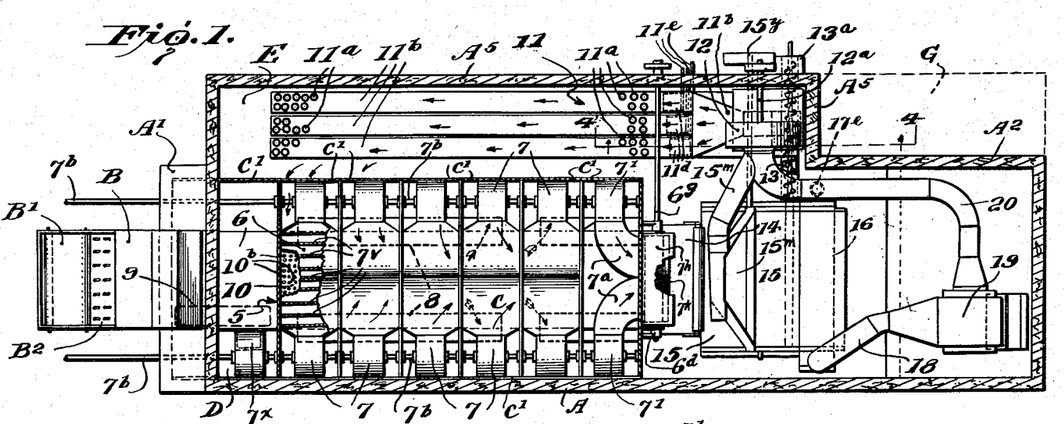
Fig. 1 is a plan view, partly in section, of an apparatus embodying our invention, with the top removed.

The conveyor 6 is preferably a sectional flight conveyor similar to that used in textile dryers. Said conveyor extends through chamber C, and is carried by sprockets $6a$ in brackets $6b$, and sprockets $6c$ on a shaft $6g$ mounted in brackets $6d$. Sprockets $6c$ may be rotated by power applied to their common shaft $6g$ (Fig. 1). The upper and lower runs of the chains of conveyor 6 may be supported by angle iron guides $6e$ (Fig. 3) carried by spaced uprights $6f$. The length and width of conveyor 6 depends upon the capacity required; ordinarily it should be from 3 feet to 6 feet in width, and from 10 to 50 feet in length.

Preferably a variable speed control (not shown) is employed to vary the speed of the conveyor 6 as the time required for freezing or congealing moisture, grease, and foreign matters on the wool fibres will vary with different wools, and with the amount and character of the foreign matters to be frozen. Such variable speed driving devices do not form part of the present invention and it is therefore unnecessary to illustrate or describe same herein.

Within chamber C are fans or blowers 7 (Fig. 3) adapted to circulate refrigerated air around and through the material on conveyor 6 within the chamber C. The fans 7 are mounted upon common shafts $7b$, which extend through the front wall of casing A' and may be rotated by suitable means (not shown). Each fan 7 directs air inwardly towards the center of the chamber C, as indicated by the arrows in Fig. 3; and vanes $7v$ (Fig. 3) direct the air downwardly through the material on the conveyor 6.

Below and at opposite sides of the conveyor in chamber C are air refrigerating devices 8 (Fig. 3) of any suitable kind, preferably comprising headers to which are connected pipes or coils 8' through which a suitable refrigerant from accumulator tanks $8t$ is passed; at the outer side of the refrigerating devices are screens $8a$ to prevent dirt from passing to the coils 8'; and at the inner side of each coil are louvres $8p$ to cause even distribution of the air.

The bottom plate 10 (Fig. 3) of chamber C extends substantially one-third of the length of the chamber immediately in rear of partition 5, said plate being preferably perforated as at $10b$. Openings (Figs. 2 and 3) are provided at $10a$ below plate 10 to permit air from the dust collector chamber E (hereinafter referred to) to pass under bottom plate 10 (Figs. 1 and 3), and up through the perforations $10b$ in the plate into the freezing chamber C adjacent the front end thereof, the perforations $10b$ are so located that the air entering chamber C must pass through the coils 8' before it passes to the blowers 7.

The rearmost fans 7' (Fig 1) withdraw air from chamber C through ducts $7a$ and discharge it into the interior of the casing through a hood $7h$ having a regulating damper $7k$.

The refrigerated material is delivered by conveyor 6 onto a second conveyor 14 which conducts the wool to a "duster" 15 of any suitable type. Preferably we use a duster of the type shown in Brown, Walters, Coleman & Brickett's application, Serial No. 713,062 filed February 26, 1934. This duster has a rotary beater $15a$, mounted on a shaft $15g$ (Fig. 1) and provided with projecting pins $15b$; and arcuate screen sections $15c$ and has a feed inlet $15i$, and an outlet closeable by a discharge door $15x$, and dust ducts $15k$ and $15n$, substantially as in said Brown et al. application. The frozen extraneous grease and foreign matters in the wool separated from the wool fibres in the duster pass into the ducts $15n$, $15k$ and are removed and discharged as hereinafter described. As described in aforesaid application Serial No. 713,062, suitable means may be provided for varying the times for feeding and discharge of the duster 15 irrespective of the speed of rotation or number of rotations of the beater $15a$, said means controlling the conveyor 14 and discharge gate $15x$. The beater $15a$ produces a considerable fan action on the air within the duster, and when the discharge door $15x$ is opened the cleaned wool is thrown out or blown out preferably into a winnowing chamber 16 (see Fig. 6).

Figures 6, 9:
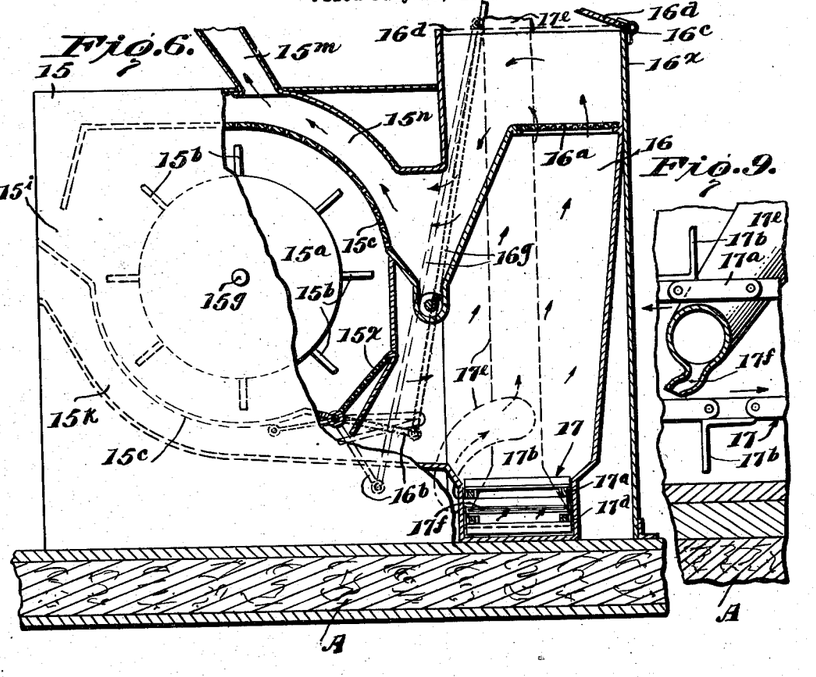
Fig. 6 is an enlarged detail sectional view through part of the duster and the winnowing chamber.
Fig. 9 is an enlarged detail of the suction end of pipe 17f.

Winnowing chamber 16 (Fig. 6) has a conveyor 17 at its bottom and a screen $16a$ at its upper end. This winnowing chamber is preferably enclosed in a housing $16x$ which forms a flue or air space exterior to the winnowing chamber, and which air space communicates with the duct $15n$, so that the suction in said duct will tend to draw air from the winnowing chamber. The top of the housing $16d$ is hinged at $16c$ and is connected by rod $16g$ to arm $16b$ on the shaft of the duster discharge door $15x$ so that when the duster door is closed the housing top is open to admit air to duster at $15n$, to duct $17e$ and to wool duct 18 (Fig. 7), and when duster door is open the housing top is closed to prevent egress of dust while duster is discharging. When door $15x$ is opened the air and material discharged into chamber 16 moves upwardly, effecting a winnowing action on the material, and the air and dust pass through screen $16a$ but the wool is retained. When door $15x$ closes the wool drops onto the conveyor 17 in a trough in the bottom of chamber 16 (Fig. 6). Said conveyor preferably has its flights $17b$ perforated as at $17c$, so that any separated foreign matters deposited thereon can pass into the trough and be moved therein by the lower run of the conveyor and discharged into the main refuse conveyor.

Figure 7:
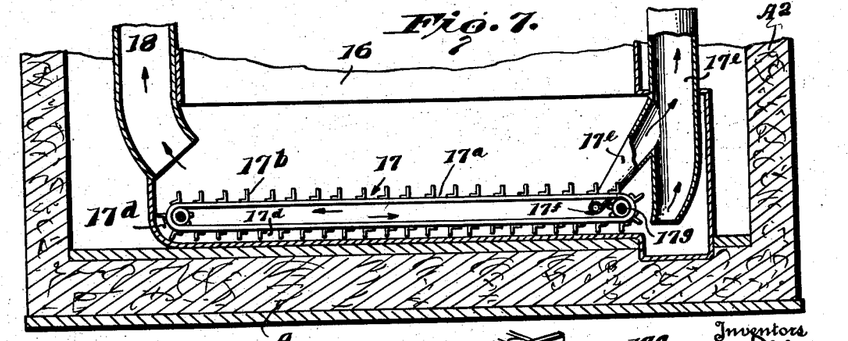
Fig. 7 is a transverse section on the line 7—7, Fig. 2.
Figure 8:
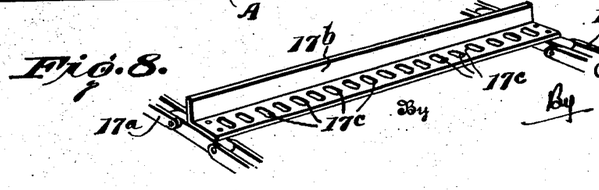
Fig. 8 is a detail view of one of the flights of the conveyor shown in Fig. 7.

The wool discharged from the duster 15 into chamber 16 is in an open condition and as it is violently agitated as it is discharged this produces a winnowing action. In this winnowing some of the foreign matter in the wool, which was freed from the wool but had not been removed in the duster, is dropped from the wool and drops onto the wool conveyor 17 ahead of the wool. Most of this foreign matter drops through the perforations 17c of the top run of the conveyor, and part of it through the perforations 17c of the lower run. Also some of the foreign matter will rest upon the horizontal legs of the flights of the top run. The wool falls upon the top edges of the vertical legs of the top flights, and is carried on these edges rather than down in the troughs between the vertical legs. As the top run moves to the left (Fig. 7) the wool is carried with it and is picked off the upper run of the conveyor 17 by air suction at the mouth of duct 18. The foreign matters which lie upon the horizontal legs of the top run flights are removed by air suction through the duct 18, but any matters not picked off by the air suction are carried around by the conveyor flights to the bottom run and fall into the trough 17d and are scraped by the flights to the right (Fig. 7) where they are carried away by air suction through a duct 17e which is connected to duct 20 (Fig. 1) which leads to the air intake of the fan 12. Any dirt which has fallen through the perforations 17c of both runs of the conveyor will also be scraped along the pan 17d to the right (Fig. 7). Some dirt which has fallen through the top run is caught on the lower run and this dirt will be picked off by an air suction duct 17f just before it reaches the right hand end of the conveyor. The provision of the suction means 17f between the runs of the conveyor is useful to prevent accumulation of dirt at the tail shaft 17g to a point where the dirt gets into the chains and sprockets.

The dust-laden air from the duster 15 is drawn through a duct 15m by a fan 12 and discharged into a dust collector 11. In the apparatus shown in Figs. 1 and 2, the dust collector is arranged in a chamber E within casing A, at one side of the freezing chamber. Preferably we use a dust collector having filter bags 11a whose lower ends connect with openings in the tops of ducts 11b.

The shaft 12a of fan 12 extends through the side wall of the casing and may be driven by any suitable means. In Figs. 1 and 3, three parallel dust collector units are shown, but less or more units may be used. Each duct 11b has a damper 11d in its inlet (Figs. 2 and 4) operable by a shaft 11e extending through the side wall of the casing, and said dampers 11d are operable independently, so that air may be shut off from any duct 11b when the filter bags 11a of its unit are to be shaken.

The dust or dirt dropped from the bags 11a can be removed by scraper conveyors 11c in the ducts 11b (Figs. 3 and 4) and discharge into the main refuse conveyor 13, disposed transveresly of the casing A below the dust fan 12. The filtered air passes downwardly in the chamber E, as shown by the arrows (Fig. 3), and through the openings 10a into the freezing chamber C.

In the construction shown there are three filter units discharging into the refuse discharge conveyor 13, and since these units may be operated under different air pressures it is desirable to air seal the scraping conveyors of each unit at its point of discharge. The scraper blades themselves may be made to serve as baffles or as moving bulkheads to prevent the escape of air from the interior of each unit, the sides of the trough being shaped and designed to closely fit the scrapers and provide the necessary air seal.

Figures 4, 5:
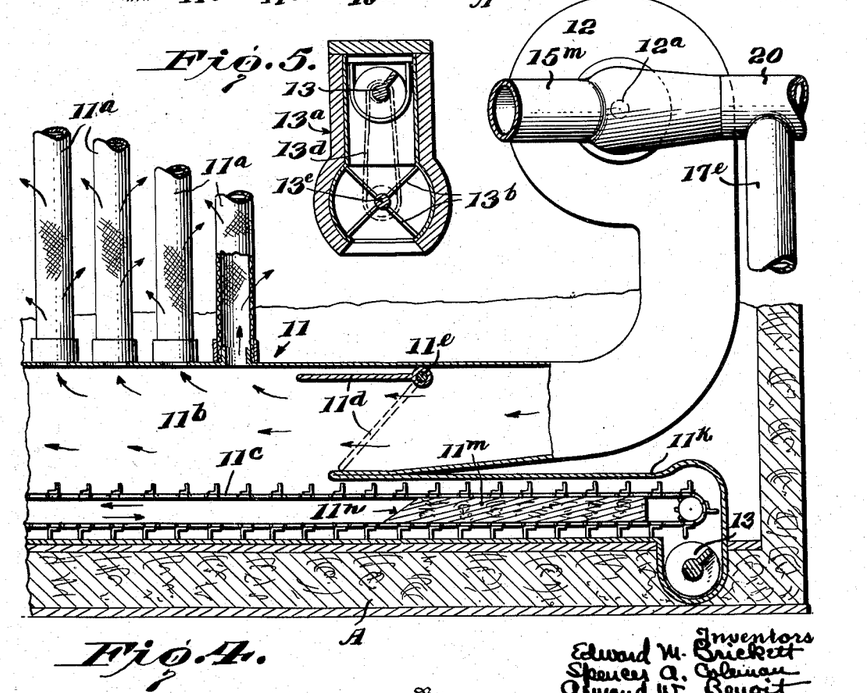
Fig. 4 is an enlarged longitudinal section of the duster separating device on the line 4—4, Fig. 1.
Fig. 5 is an enlarged section through the air seal at the discharge end of the main refuse conveyor.

As shown in Fig. 4, the scrapers on the lower run of the conveyor contact with the bottom of the trough of the air duct 11b; and preferably a plate 11k is arranged above and contacts with the tops of the scrapers of the upper run of the conveyor, said plate 11k extending from the point where the conveyor 11c merges from the rear end of the duct 11b to a point adjacent the rear sprocket of the conveyor. The scrapers on the upper and lower runs of the conveyor contacting with the bottom of the duct 11b, and with the plate 11k, serve as moving bulkheads, and the part of the conveyor 11c between the top and bottom runs thereof, is sealed by an elongated block 11m of wood or metal, located between the runs of the conveyor and sealing the area between the runs of the conveyor. The block has its inner end beveled as at 11n. The scrapers of the bottom run of the conveyor catch dirt as it falls in the dust chamber, or as it falls from the bags when they are shaken, and but for this block large clumps of dirt falling on top of the scrapers on the lower run of the conveyor might remain there and cause the scrapers to jam as they are pulled under the block 11m, but the sharp nose 11n of the block will remove the clumps of dirt from the tops of the scrapers before they pass under the block 11m. Any large clump of dirt carried to the nose 11n will be pushed up the incline of the nose and will slide back, or be pushed back by contact with the upper run of scrapers if the amount is sufficient to build up the dirt on the incline until it extends into the path of the upper run of scrapers. The plate 11k, and block 11m permit the removal of the dirt from the duct 11b to the discharge conveyor 13 without permitting the dust-laden air to flow directly out of the said duct along the path of the conveyor 11c.

Preferably the filter bags of each unit are shaken periodically, by first closing the damper 11d of said unit (so that the other two units temporarily receive all of the air), and the bags of the cut out unit are shaken while its air supply is cut off. Thus the dust collector units can be shaken without having to interrupt the flow of air from the fan 12.

An automatic timing device (not shown) may be used to open and close the dampers 11d and shake down successive filter units at specified intervals. The fan 12 also provides the suction necessary for the operation of a condenser 19 (hereinafter described), and discharges the air flowing from the condenser into the dust collector.

The clean wool deposited on the top run of the conveyor 17 is carried over to the mouth of the flue 18 leading to the wool condenser 19.

As previously described the dust fan 12 draws air through the flue 18, through the condenser 19, and thence through the flue 20 to the fan 12, and hence the air suction thus set up at the mouth of the flue 18 picks the wool off the conveyor 17 and carries it to the condenser in which the cleaned wool is separated from the air currents and dropped to the discharge sealing rolls 4—4 which serve to maintain a seal against the inflow or outflow of air. The cleaned wool is discharged through outlet 3 into suitable receptacles or directly into a scouring bowl (not shown) or into a machine employed in subsequent treatment of the wool, or into a chute, or onto a conveyor leading to such subsequent apparatus. The separated air passes from condenser 19 through a flue 20 into the air intake of dust fan 12.

As stated, the dirt and refuse from the dust collector is delivered to the refuse discharge conveyor 13 and discharged out of the casing, and the light dust and impurities withdrawn from the duster and winnowing chamber through the ducts 15m and 17e also pass to the fan 12 and thence to the dust collector. The heavy impurities separated from the wool in the duster and in the winnowing chamber are directed to the refuse discharge conveyor 13 and discharged thereby from the casing.

To prevent escape of cold air from the casing at outlet of the discharge conveyor 13 we provide an air seal 13a (Figs. 1 and 5), which comprises a hood enclosing the outer end of the discharge conveyor 13 and having a parti-cylindric chamber at its lower end in which is a valve 13b having four evenly spaced vanes and mounted on a shaft 13c which may be driven by a sprocket chain 13d and sprockets on the shafts of the conveyor and valve as indicated in Fig. 5. This seal permits discharge of the refuse without providing an opening for direct escape of cold air from the casing.

The air drawn in from the dust collector chamber E will be somewhat warmer than that in chamber C, but such warmer air must follow the helical cycles of the air in the chamber and pass through the refrigerating coils 8' and will be properly refrigerated.

The space G bounded by the dotted lines in Fig. 1 exterior of casing A and directly in rear of extension A5 may be used for installation of the motors for driving the various parts of the apparatus. The space required for installation of the apparatus is maintained at a minimum and no extra ground or overhead room is required for the installation of the motors.

Figure 10:
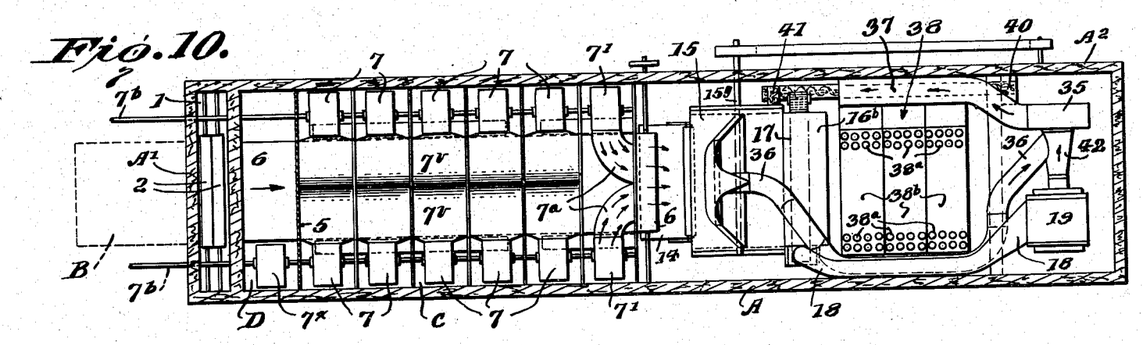
Fig. 10 is a plan view with top removed, and partly in section, of a modification of the apparatus.
Figure 11:
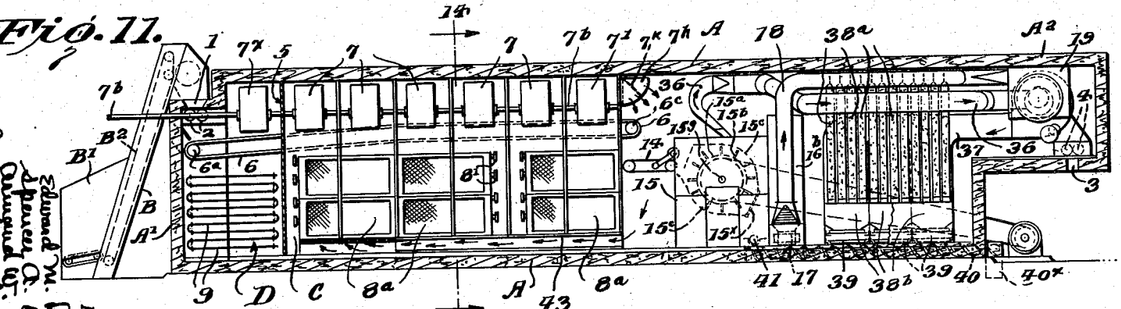
Fig. 11 is a side elevation, with the front removed, of the apparatus shown in Fig. 10.

In some cases it may be desirable to have the dust collector located in line with the freezing chamber and duster rather than at the side thereof. As shown in Figs. 10 and 11, the dust fan 35 (Fig. 10) is mounted in the rear end of the casing A2, and its intake is connected by a flue 36 to the dust ducts of duster 15, so that the lighter particles separated from the wool in the duster will be drawn off by the dust fan and discharged through a flue 37 into the units of a bag-type dust collector 38 located in rear of the duster 15. The dust collector 38 is in general similar to the dust collector shown in Figs. 1-3, but its units 38a extend transversely of casing A instead of longitudinally. The separated dust and impurities fall from the collector into ducts 38b and are moved by conveyors 39 to one side of the machine and delivered into a conveyor 40 which discharges the refuse out of the casing through an air seal 40x similar to seal 13x. Similar to the arrangement shown in Figs. 1 to 3 the wool discharged from winnowing chamber 16b is carried by conveyor 17 into the flue 18 which directs it to the condenser 19, from which the wool is discharged by the out-feeding sealing rolls 4 to the outlet 3; the air from condenser 19 passes through flue 42 directly to the air inlet of the dust fan 35.

Figure 13:
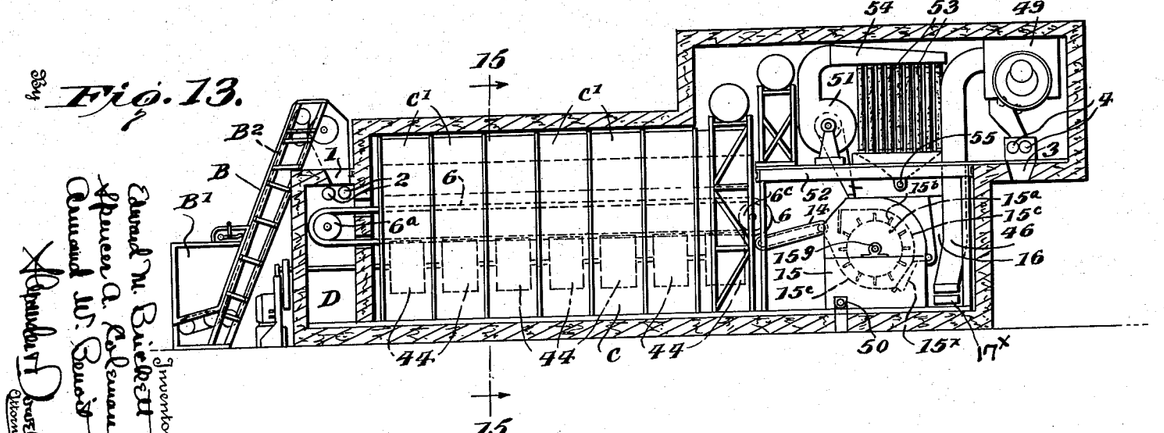
Fig. 13 is a side elevation with the front removed, and partly in section, of a further modification of the apparatus.
Figure 14:
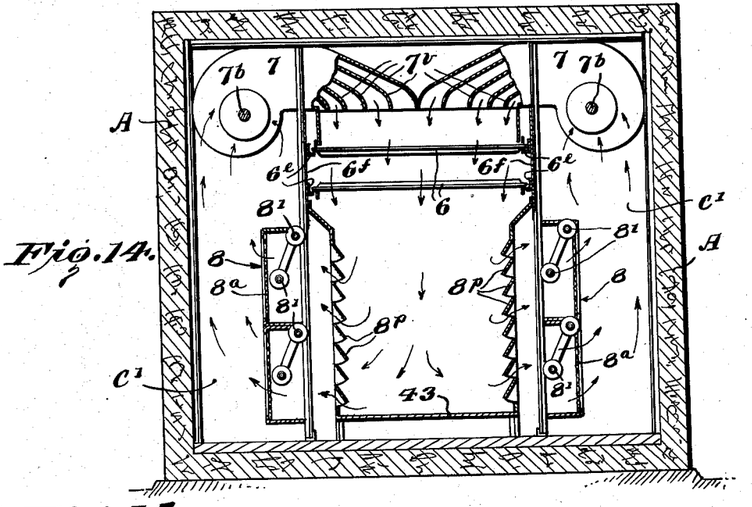
Fig. 14 is a transverse section on the line 14—14, Fig. 11.
Figure 15:
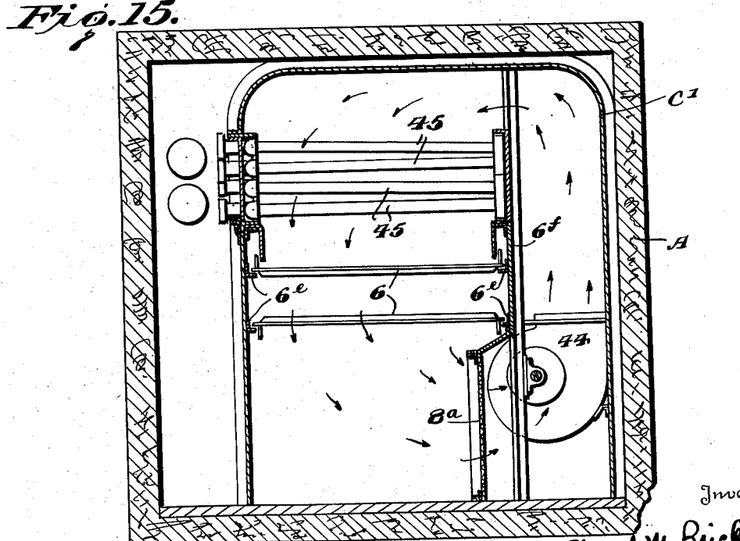
Fig. 15 is a transverse section on the line 15—15, Fig. 13.

In some cases on account of the space in which the apparatus is to be used, it may be desirable to place the dust collector above the duster; as shown in Fig. 13. The apparatus shown in Fig. 13 is similar to that shown in above described Figs. 1 and 2 in the arrangement of the feeder B, frost chamber D, freezing chamber C, freezing conveyor 6, feed sheet 14, and duster 15. In this modification fans 44 (see Fig. 15) are disposed below the freezing conveyor 6, and direct air upwardly from the lower portion of the chamber C, along one side of the chamber and then down through horizontally disposed refrigerating coils 45, and through the conveyor 6 and the wool carried thereon. The cleaned wool from the duster 15 is carried up through a flue 46 to the condenser 49, from which the cleaned wool is discharged between out-feeding sealing rolls 4 to outlet 3. A fan (located behind the condenser and not shown in the drawings) draws the processed wool through suitable connecting ducts from the belt 17x in the winnowing chamber and discharges it into the condenser 49, substantially as hereinabove described. The refuse discharged from the duster 15 is carried off by a conveyor 50 disposed transversely of casing A and extending through the side thereof. In this modification the dust collector fan 51 is mounted upon a platform 52 above the duster, as is also the dust collector 53 to which the dust-laden air is directed by fan 51 through a flue 54. The dirt from the dust collector 53 is discharged by an endless conveyor 55 extending through the side of the casing.

Figure 2:
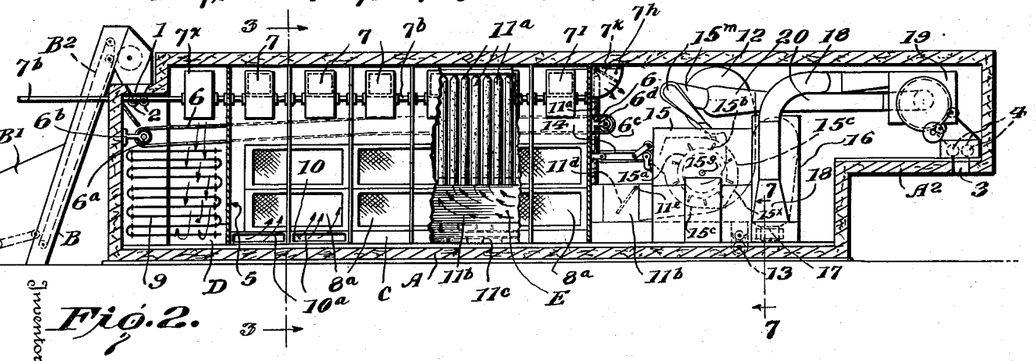
Fig. 2 is a side view, partly in section, of said apparatus, with the front wall removed.
Figure 3:
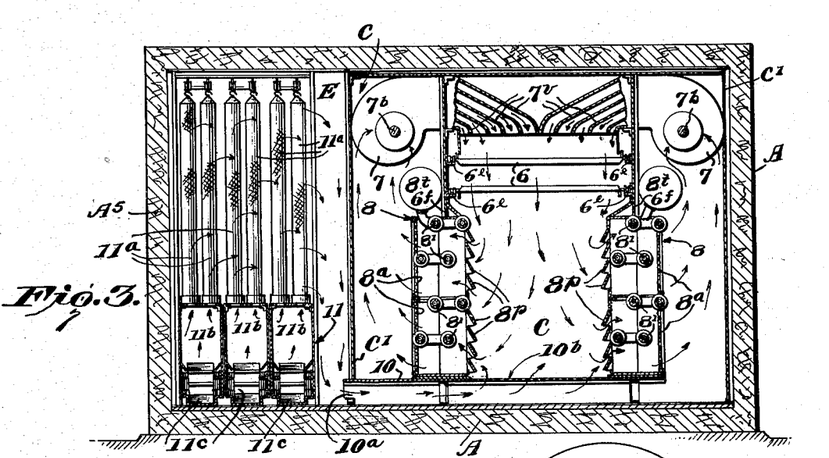
Fig. 3 is an enlarged transverse section on the line 3—3, Fig. 2.
Figure 12:
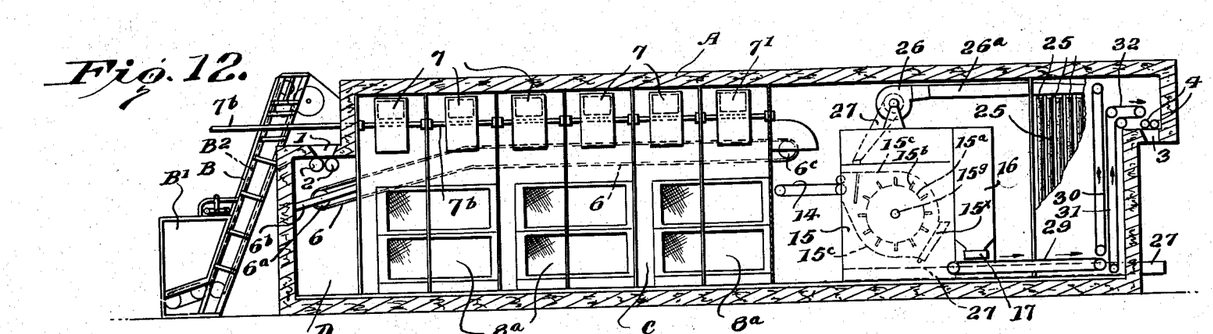
Fig. 12 is a side elevation with the front removed, and partly in section of another modification of the apparatus.

The apparatus shown in Fig. 12 is similar to that shown in Figs. 1-3, as far as the feeder B, conveyor 6, refrigerating coils 8', screens 8a, fans 7, feed sheet 14 and duster 15 are concerned. In this modification the dust collector 25 is disposed in rear of the duster 15, and a fan 26 draws air and dust through flue 27 from the dust ducts of duster 15, and discharges same through flue 26a into the filter units of the dust collector 25. The dirt separated from the wool in duster 15 is removed by a conveyor 27 and discharged from the casing. The cleaned wool discharged from the winnowing chamber 16b is delivered by a horizontal conveyor belt 29 to vertically disposed conveyor belts 30—31 which in turn deliver it to a horizontal extension 32 of belt 31, by which it is discharged between the out-feeding sealing rolls 4 to the outlet 3. In this modification the series of horizontal and vertically disposed belts 29—30—31—32 take the place of the condenser shown in Figs. 1 to 3.

While we prefer to use an endless conveyor to move the material through the freezing chamber we do not consider the invention limited to any specific form of such conveyor or conveying means in practice, nor to the specific form of any other conveyors illustrated in the drawings.

We claim:—

1. Apparatus for cleaning wool and related animal fibres, comprising a refrigerating chamber, means for passing wool to be refrigerated through said chamber, means for separating frozen extraneous matters from the refrigerated wool, means for discharging the separated extraneous matters, a winnowing chamber into which the separated wool is discharged, means for separately discharging the wool and impurities separated therefrom in said winnowing chamber; and means for directing the air from the wool and impurity discharging means into the refrigerating chamber.

2. Apparatus for cleaning wool comprising a refrigerating chamber, means for passing wool through the refrigerating chamber, means for separating frozen extraneous matters from the refrigerated wool, means for discharging the separated extraneous matters, a winnowing chamber into which the separated wool is discharged, a dust collector, means for withdrawing dust-laden air from the separating means and from the winnowing chamber and conducting it to the dust collector, and means for separately discharging from the winnowing chamber the clean wool and impurities separated therefrom in said chamber.

3. Apparatus for cleaning wool comprising, a de-hydrating chamber, a refrigerating chamber, means for feeding wool into the de-hydrating chamber, means for passing wool from the de-hydrating chamber through the refrigerating chamber, means for separating frozen extraneous matters from the refrigerated wool, means for discharging the separated extraneous matters, a dust collector, means for withdrawing dust-laden air from the separating means and conducting it to the dust collector, means for directing the air from the dust collector to the refrigerating chamber, and means for discharging the clean wool.

4. Apparatus for cleaning wool comprising a de-hydrating chamber, a refrigerating chamber, means for feeding wool into the de-hydrating chamber, means for passing wool from the de-hydrating chamber through the refrigerating chamber, means for separating frozen extraneous matters from the refrigerated wool, means for discharging the separated extraneous matters, a winnowing chamber into which the separated wool is discharged, a dust collector, means for withdrawing dust-laden air from the separating means and from the winnowing chamber and conducting it to the dust collector, and means for discharging the clean wool from said winnowing chamber.

5. In apparatus of the character specified; a casing; a conveyor in the casing, means for circulating cold air in the casing, means for feeding material onto the conveyor, a duster receiving material from the conveyor, means for discharging separated impurities from the duster, a winnowing chamber into which the duster discharges the cleaned material, means for separately discharging from said chamber the cleaned material and the impurities separated therefrom in such chamber; and means for directing the air from the discharging means into the air circulating means.

6. In apparatus as set forth in claim 5, the means for discharging impurities from the winnowing chamber including an air flue extending from the winnowing chamber; and means for diverting air from the flue and returning it to the cold air circuit in the casing.

7. In apparatus as set forth in claim 5, the discharging means for the cleaned material comprising a system of horizontal and vertical conveyors.

8. In apparatus of the character specified; a casing, a conveyor in the casing, means for circulating cold air in a closed circuit within the casing, means for feeding material onto the conveyor, a duster for receiving material from the conveyor, means in the cold air circuit for separating dust particles from the air, and means for directing the air from the separating means to the air circulating means.

9. In an apparatus of the character specified, a refrigerating chamber, a conveyor in said chamber, means for circulating cold air in the chamber, means for feeding material onto the conveyor, a duster for receiving material from the conveyor, a winnowing chamber into which the duster discharges the material; means for separately discharging the cleaned material and the impurities separated therefrom from said winnowing chamber; and means for directing the air from the discharging means into the air circulating means.

10. In apparatus as set forth in claim 9, the discharging means for the cleaned material including a flue; a condenser in said flue adjacent its outlet to prevent air escaping through the outlet; and means for returning the air from the condenser to the cold air circulating means.

11. In apparatus of the character specified; a refrigerating chamber, a conveyor in the chamber, means for circulating cold air in the chamber, means for feeding material onto the conveyor, a duster receiving material from the conveyor, an air filter, means for directing dust-laden air from the duster to the air filter, means for separately discharging the cleaned material from the duster; and means for directing the air from the filter and from the discharging means into the air circulating means.

12. In apparatus of the character specified, a refrigerating chamber, a conveyor in the chamber, means for circulating cold air in an approximately spiral path through the chamber, means for feeding material onto the conveyor, a duster receiving material from the conveyor, a winnowing chamber into which the duster discharges, means for separately discharging the cleaned material and the separated impurities from the duster; means for separately discharging the winnowed material and dust from the winnowing chamber; and means for directing the air from each said discharging means into the air circulating means.

13. In apparatus of the character described, a casing; means for circulating air in the casing, a duster, means for feeding fluffy material to the duster; an endless conveyor onto the upper run of which the cleaned material is deposited; a duct at one end of the conveyor through which the cleaned material is removed; a trough cooperating with the lower run of the conveyor for moving the separated foreign matters to the opposite end of the conveyor; and a second duct at such end of the conveyor by which the separated foreign matters are discharged.

14. In apparatus of the character specified; a casing, a duster in the casing, means for feeding material containing extraneous foreign matters into the duster; a dust separator; a flue conducting air carrying foreign matters from the duster to the separator; a damper in the inlet of said separator; a conveyor in said separator, and means for preventing direct passage of air into or out of the separator along the conveyor.

15. In apparatus as set forth in claim 14, said latter means comprising a casing enclosing the discharge end of the conveyor, and means interposed between the runs of the conveyor in said casing, and engaging the inner portions of said runs.

16. In an apparatus as set forth in claim 14, a block interposed between the runs of the conveyor and having its inner end beveled to form a dirt removing blade.

17. In apparatus of the character specified, a refrigerating chamber, a duster, a dust collector, means for directing material through the refrigerating chamber, means for directing the refrigerated material to the duster, means for conducting dust-laden air from the duster to said dust collector, means permitting return of filtered air from the dust collector to the refrigerating chamber; means for discharging the dusted material from the duster outside the apparatus; and means for returning the air from the discharging apparatus into the refrigerating chamber.

18. In apparatus of the character specified; a refrigerating chamber, a conveyor in the chamber; means for feeding material onto the conveyor, a duster receiving material from the conveyor, means for circulating cold air in the chamber, an air filter, means for directing dust-laden air from the duster to the air filter, means for returning the air from the filter to the refrigerating chamber, means for discharging the dusted material, a conveyor for discharging the separated dust, and an air seal at the outlet of said conveyor to permit the discharge of foreign matters while preventing direct escape of air.

19. In apparatus of the character specified, a refrigerating chamber, a conveyor for moving material through said chamber, a series of refrigerating coils disposed in said chamber at opposite sides of the conveyor, a series of downwardly directed air deflecting vanes in said chamber above the conveyor, a series of blowers arranged in said chamber at opposite sides of and above the conveyor for directing air in a plurality of endless circuits successively through the adjacent vanes, the conveyor and the refrigerating coils.

20. In apparatus for cleaning wool and related animal fibres, a duster, a winnowing chamber into which the duster discharges, a condenser, means for conducting cleaned fibres from the winnowing chamber to the condenser, a dust collector, means for conducting air containing impurities from the duster to the dust collector, means for conducting air containing impurities from the winnowing chamber to the dust collector, and means for directing the air from the dust collector back into the apparatus.

21. Apparatus for cleaning wool, etc., comprising a refrigerating chamber, a duster, means for directing refrigerated wool from the refrigerating chamber to the duster, a winnowing chamber, means for directing wool from the duster into the winnowing chamber, means for discharging cleaned wool from the winnowing chamber, a dust collector, means for directing dust-laden air from the duster to the dust collector, means for directing dust-laden air from the winnowing chamber to said dust collector, a refuse discharge conveyor, means for directing separated impurities from the duster to said discharge conveyor, means for discharging separated impurities from the winnowing chamber to said conveyor, and means for discharging the separated dust from the dust collector to said conveyor.

22. Apparatus for cleaning wool; comprising a casing; a refrigerating chamber, a duster, a winnowing chamber, a dust separator and a condenser, means for conveying wool through the refrigerating chamber and delivering it to the duster, means for discharging cleaned wool from the duster into the winnowing chamber, means for discharging the clean wool from the winnowing chamber out of the casing, means for discharging heavy impurities separated in the duster out of the casing, means for directing dust-laden air from the duster to the dust separator, means for directing dust-laden air from the winnowing chamber to the dust separator, and means for directing cleaned air from the dust collector to the refrigerating chamber.

23. Apparatus for cleaning wool; comprising a dehydrating chamber, a refrigerating chamber, a duster, a winnowing chamber, and a dust separator, means for feeding wool into the dehydrating chamber, means for conveying material from the de-hydrating chamber to and through the refrigerating chamber and delivering it to the duster, means for discharging the heavier impurities separated in the duster out of the casing, means for discharging refrigerated wool from the duster into the winnowing chamber, means for discharging the clean wool from the winnowing chamber out of the casing, means for directing dust-laden air from the duster to the dust separator, means for directing dust-laden air from the winnowing chamber to the dust separator, and means for circulating refrigerated air in the de-hydrating chamber and means for circulating air in the refrigerating chamber, and means for directing cleaned air from the dust collector into the refrigerating chamber.

24. In apparatus of the character described, a duster, a winnowing chamber into which material is discharged by the duster; a conveyor in the winnowing chamber, a suction duct for removing the cleaned material from the conveyor, a second suction duct by which the light foreign matters separated from the material in the winnowing chamber are discharged, and means to prevent excess accumulation of foreign matters on the lower run of the conveyor adjacent the second suction duct.

25. In apparatus of the character described, a duster, a winnowing chamber into which material is discharged by the duster; a conveyor in the winnowing chamber, a suction duct for removing the cleaned material from the conveyor, a second suction duct by which the light foreign matters separated from the material in the winnowing chamber are discharged, and an auxiliary suction duct for removing foreign matters from the upper side of the lower run of the conveyor to prevent excess accumulation of foreign matters.

EDWARD M. BRICKETT.
SPENCER A. COLEMAN.
ARMAND W. BENOIT.